United States Patent [19]

Bourgeois

[11] Patent Number: 4,459,070

[45] Date of Patent: Jul. 10, 1984

[54] PNEUMATIC TANK SYSTEM FOR STORAGE AND TRANSFER OF PULVERULENT MATERIAL

[75] Inventor: Tim Bourgeois, Houma, La.

[73] Assignee: P.B.C. Systems, Inc., Houma, La.

[21] Appl. No.: 269,674

[22] Filed: Jun. 2, 1981

[51] Int. Cl.³ .................. B65G 53/22; B65G 53/38
[52] U.S. Cl. ...................................... 406/90; 105/247; 220/444
[58] Field of Search ................. 406/90, 91, 138; 222/195; 220/444; 105/243, 247, 358, 360; 52/197, 309.4

[56] References Cited

U.S. PATENT DOCUMENTS

| | | |
|---|---|---|
| 2,524,919 | 10/1950 | Meincke . |
| 2,602,707 | 7/1952 | Garoutte . |
| 2,609,125 | 9/1952 | Schemm . |
| 2,694,496 | 11/1954 | Atkinson ........................ 406/90 X |
| 2,723,838 | 11/1955 | Peters . |
| 2,815,987 | 12/1957 | Sylvest . |
| 2,915,340 | 12/1959 | Lusted . |
| 2,924,489 | 2/1960 | Beckmann . |
| 3,127,851 | 4/1964 | Auksel . |
| 3,236,422 | 2/1966 | Bailey et al. . |
| 3,275,197 | 9/1966 | Eklund . |
| 3,301,280 | 1/1967 | Lau . |
| 3,305,142 | 2/1967 | Caldwell . |
| 3,352,606 | 11/1967 | Page et al. . |
| 3,421,663 | 1/1969 | Paton . |
| 3,486,282 | 12/1969 | Moriarity ........................ 52/197 X |
| 3,514,158 | 5/1970 | Stahler et al. . |
| 3,563,610 | 2/1971 | Speegle et al. ........................ 406/91 |
| 3,584,564 | 6/1971 | Rollins ........................ 105/247 X |
| 3,586,383 | 6/1971 | Trythall . |
| 3,682,824 | 8/1972 | Creaser . |
| 3,687,087 | 8/1972 | Yurkoski et al. ................ 105/358 X |
| 3,858,763 | 1/1975 | Mack . |
| 3,862,707 | 1/1975 | Reiter . |
| 3,933,394 | 1/1976 | Klein et al. . |
| 3,989,147 | 11/1976 | Fried . |
| 4,082,205 | 4/1978 | Kluger et al. . |
| 4,088,373 | 5/1978 | White . |

FOREIGN PATENT DOCUMENTS

| | | |
|---|---|---|
| 1085091 | 7/1960 | Fed. Rep. of Germany ...... 406/138 |
| 1129892 | 5/1962 | Fed. Rep. of Germany . |
| 1274990 | 8/1968 | Fed. Rep. of Germany . |
| 1283147 | 11/1968 | Fed. Rep. of Germany . |
| 1435601 | 5/1976 | United Kingdom . |

*Primary Examiner*—Jeffrey V. Nase
*Attorney, Agent, or Firm*—Fleit, Jacobson, Cohn & Price

[57] ABSTRACT

An improved vertical cylindrical pneumatic tank for storage and transfer of pulverulent material of the type having inclined slope sheets, air slides, and an air inlet line, which improvement comprises an air manifold coupling the air inlet line to the air slide for directing air to the air slide in a closed system, and a pressure resistant filling material, such as foam, surrounding the manifold and filling the lower compartment for supporting the slope sheets and preventing pulverulent material from entering the lower compartment of the tank.

2 Claims, 5 Drawing Figures

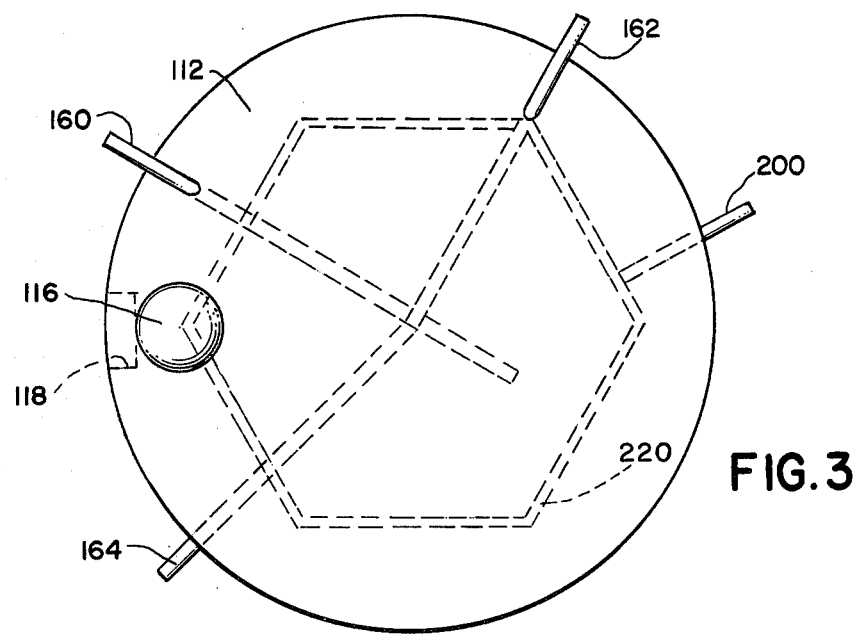
FIG. 3
FIG. 4
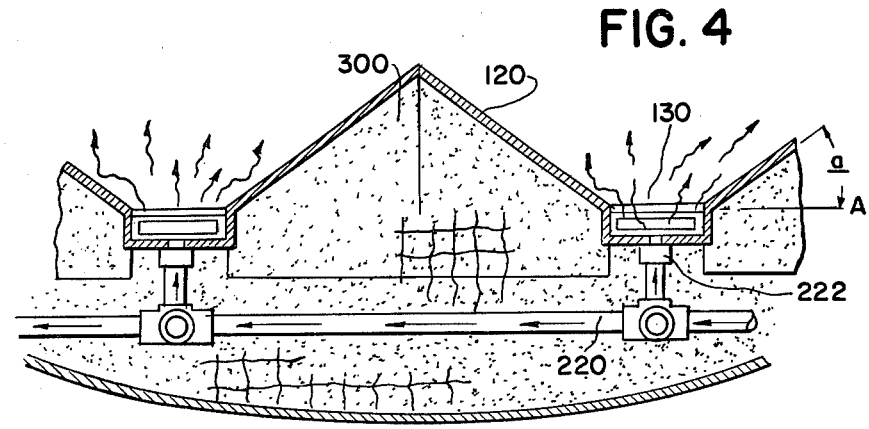
FIG. 5
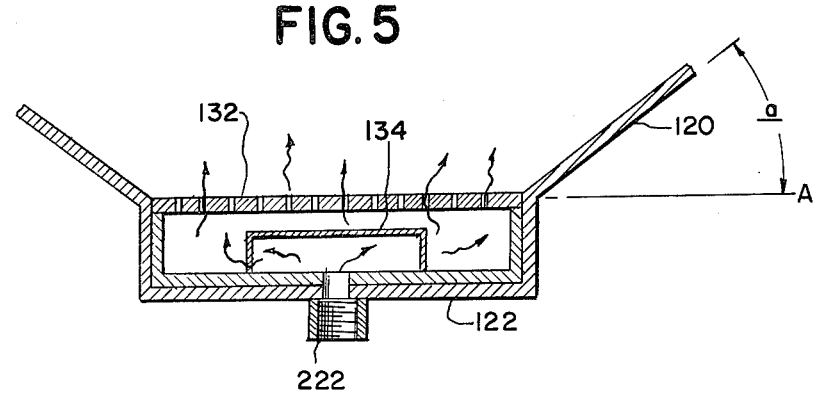

PNEUMATIC TANK SYSTEM FOR STORAGE AND TRANSFER OF PULVERULENT MATERIAL

BACKGROUND OF THE INVENTION

1. Field of the Invention

This invention relates to pneumatic tank systems, and in particular to a vertical cylindrical tank system for the storage and transfer of pulverulent or powdered material, such as cement or barite.

2. Description of the Prior Art

Conventional tank systems used for the storage and transfer of pulverulent material, such as powdered cement or barite, in the on shore and off shore petroleum drilling industry, typically utilize systems for aerating and pressurizing the contents of the tank to facilitate unloading of the pulverulent material. One such conventional tank is of the vertical cylindrical type having two equal flanged and dished heads on either end of the vertical cylinder. It normally has inclined slope sheets mounted adjacent the bottom of the tank. Air slides having porous slide plates are mounted between the slope sheets. The powdered material is stored in the tank and rests on the surface formed by the slope sheets and air slides. Pressurized air is directed into the hollow area beneath the air slides and slope sheets, and nipples are provided to admit this air chamber for receiving and distributing pressurized air to the various air slides provided for aerating the material. Aeration of the material resting on the air slides and slope sheets causes it to be in a fluidized state whereby it can be readily discharged under pressure from the tank for transferring the powdered material therefrom.

One problem encountered with such conventional tank systems is the tendency of the powdered material contents to infiltrate or settle into the area of the tank beneath the slope sheets. Thus, unwanted loss of a portion of the powdered material from the upper or storage area may occur. In addition, infiltration of the powdered material into the area beneath the slope sheets may result in the contamination of the aerating system, since the particulate material may readily obstruct the nipples admitting the air to the air slides. Furthermore, such a conventional tank having an area beneath the air slides and slope being filled with air under pressure requires that an inordinate amount of air be utilized in the system. Also, such conventional tanks utilize complex construction to provide support for the slope sheets and to resist the force of accumulated air pressure in the area either above or below the slope sheets and air slides. To avoid damaging the air slides and slope sheets due to potential air pressure differential between the area above and beneath the air slides and slope sheets, conventional tanks attempt to equalize the air pressure in the upper and the lower areas by providing two conduits for permitting air flow in opposite directions. One such conduit requires a filter to prevent the powdered material from entering the lower compartment, and the other conduit includes a differential pressure relief valve for holding a back pressure to force the air from the lower area through the nipples into the upper area to accomplish aeration of the pulverulent material.

SUMMARY OF THE INVENTION

It is an object of the present invention to construct an improved pneumatic tank system for storage and transfer of pulverulent material in which the slope sheets are protected from damage caused by operating pressures created in the tank.

It is another object of the present invention to construct a tank in which the pulverulent material contents thereof are prevented from becoming lost from the storage area of the tank.

It is a further object of the present invention to prevent the powdered material stored in the tank from entering the area beneath the slope sheets and obstructing and contaminating the aeration system.

It is an object of the present invention to minimize the volume of air required for effective aeration of the particulate material, while maintaining sufficient amount of air pressure being directed into the pulverulent material for aeration.

It is another object of the present invention to construct a tank which provides an improved construction to support the slope sheets and aeration surface against the force of the accumulated air pressure in the upper compartment.

A further object is to construct an improved tank system which includes an efficient system for distribution of air for the aeration of the pulverulent material.

Finally, it is an object that the improved tank be simple and economical to construct and use, yet offer improved durability and reliability.

Further objects of the present invention will become apparent in the full description of the invention taken in conjunction with the drawings set forth below.

The improved pneumatic tank adapted for storage and transfer of pulverulent material is of the vertical cylindrical type having inclined slope sheets and an air slide mounted therebetween for directing the pulverulent material to an end of a material discharge outlet located in the tank, and an air inlet. The slope sheets and air slide surface form a partition defining an upper and lower compartment within the tank. A conduit system is coupled to the air inlet and to the air slide for conducting air under pressure to the air slide in order to aerate and fluidize the pulverulent material in the upper compartment, and a filling material fills the lower compartment for supporting the slope sheets and air slide surface and for preventing the pulverulent material from entering the lower compartment. In one embodiment, the filling material is a durable pressure resistant polyurethane foam. The conduit system preferably comprises a manifold connecting a plurality of air slides to provide a closed aeration system within the lower compartment, the manifold being entirely surrounded by the foam.

BRIEF DESCRIPTION OF THE DRAWINGS

FIG. 3 is a top view of the tank showing various inlet and outlet lines and positioning of the air inlet conduit system in accordance with the present invention.

FIG. 4 is a sectional view along line 4—4 of FIG. 2 showing one embodiment of an air manifold conduit sustem for conducting air under pressure to the air slides in accordance with the present invention.

FIG. 5 is a sectional view along line 5—5 of FIG. 2 showing one embodiment of an air slide in accordance with the present invention.

DESCRIPTION OF THE PREFERRED EMBODIMENTS

Figure 1:
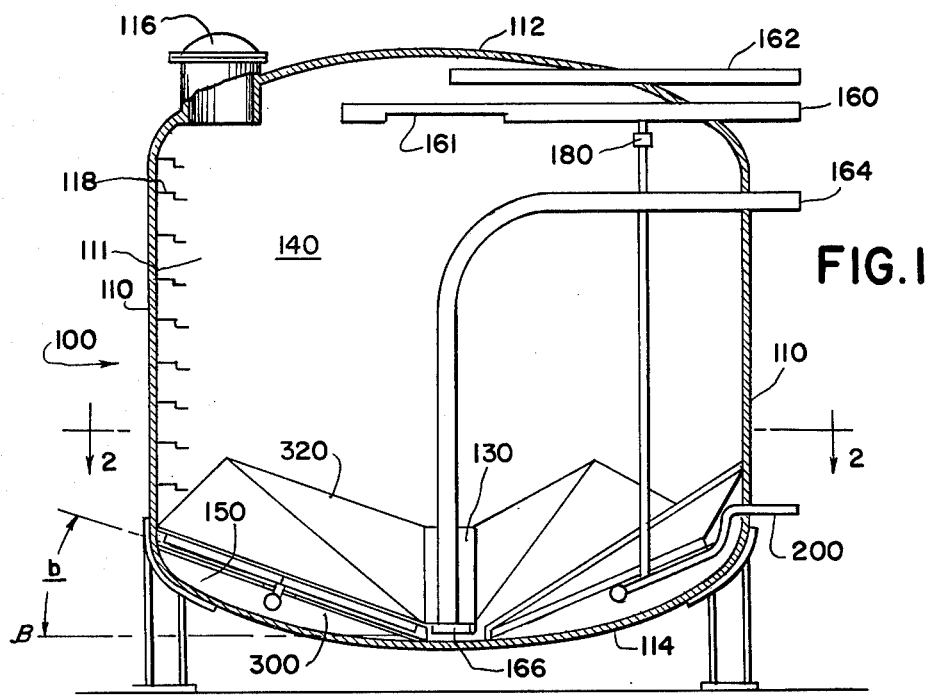
FIG. 1 is a side elevation view, in vertical cross section, of a preferred embodiment of an improved pneumatic tank system adapted for storage and transfer of pulverulent material in accordance with the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Referring to the drawings, in FIG. 1 there is shown a pneumatic tank system 100 adapted for the storage and transfer of powdered or pulverulent material, having vertical cylindrical walls 110, and upper and lower flanged and dished heads 112, 114, covering the upper and lower ends of the walls, respectively, and forming a housing defining a closed chamber 111. The heads are hermetically sealed to the walls in order to permit the tank to maintain pressure needed for operation of the tank system. The height of the walls of the tank are approximately the same as the diameter of the tank. The upper head has a normally closed manway 116, and ladder rungs 118 are attached to the wall 110 directly beneath the manway to permit entry into the tank if desired.

In the lower portion of the tank there are mounted inclined slope sheets 120. Between the slope sheets 120 there are mounted inclined air slides 130. As shown in FIGS. 4 and 5, the slope sheets 120 are inclined with respect to horizontal axis A at an angle a, a preferred value for a being on the order of 37½°. The slope sheets are hermetically sealed at the outer edge 320 to the inner surface of the vertical cylindrical walls 110. This serves to prevent material from entering the lower compartment, and to support the slope sheets during and after construction of the tank. The slope sheets also include a folded channel portion 122 at the bottom of the inclined slope sheets 120 which extends radially outward from the lower central portion 166 of the tank.

The air slide 130 is mounted in folded channel 122 of the slope sheet 120, and includes a conventional perforated air slide fabric 132 forming the upper surface of the air slide. The air slide 130 mounted in folded channel 122 is inclined with respect to horizontal axis B shown in FIG. 1 at an angle b, a preferred value for b being on the order of 37½°. A diffuser 134 is mounted beneath the slide fabric 132 for diffusing the air entering the air slide.

The surface defined by the slope sheets an air slides creates a partition which separates the tank into an upper compartment 140 and a lower compartment 150. The upper compartment 140 contains the pulverulent or powdered material to be stored and/or transferred. The material is introduced into the upper compartment 140 via a fill line 160 positioned horizontally in the upper head 112 of the tank, having an open end 161 for allowing the introduced material to fall to the center of the tank. The upper head also has mounted therein a vent line 162. The vent line only permits venting of air out of the tank when it is being filled with material. The inclination of the slope sheets and air slide serves to direct the pulverulent material toward the lower central portion 166 of the tank. A discharge line 164 is positioned in the upper compartment for carrying the powdered material vertically away from lower central portion 166 of the tank to a point outside the upper compartment.

Figure 2:
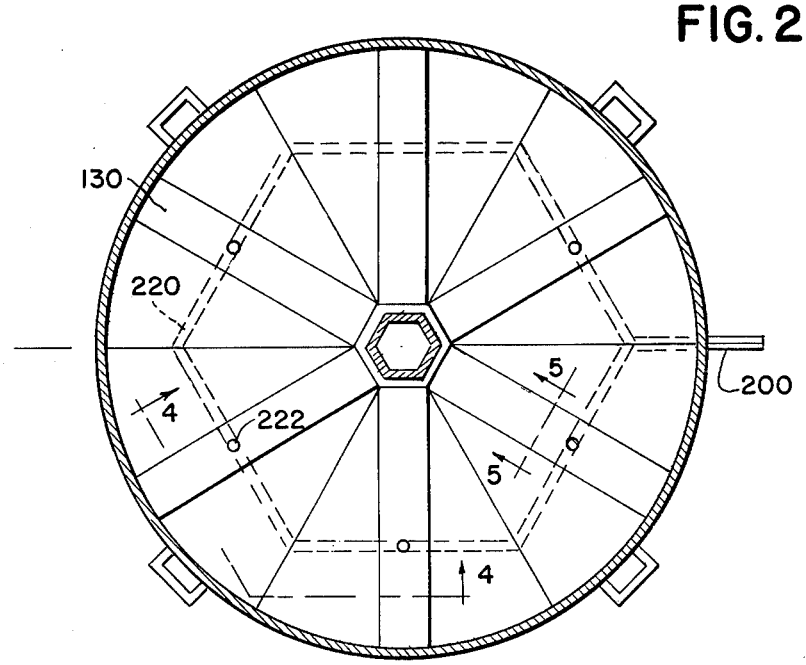
FIG. 2 is a sectional view along line A—A of FIG. 1 showing one embodiment of the aeration system in accordance with the present invention.

The lower compartment 150 houses aeration elements and includes an air inlet line 200. The air inlet line is coupled to provide air communication to each air slide 130 by means of conduit system or network 220. The conduit is in the form of an air inlet manifold, having common header air inlets 222, which provides a direct and hermetically sealed connection to each air slide 130. Thus, there is provided a closed aeration system. As shown in FIGS. 2 and 3, a preferred embodiment has six air slides 130 extending radially from the center of the tank. The manifold structure is arranged in the form of a hexagon positioned beneath the slope sheets and air slides. The manifold is connected to each of six air slides 130 via header air inlets 222 to provide air communication between the air inlet 200 and each air slide.

By utilizing a manifold arrangement to provide a closed aeration system, many advantages are obtained. The potential obstruction of the air inlet to the air slides caused by material allowed to enter the lower compartment, such as by inadequate hermetic seals around the outer edges of the slope sheets, as found in the prior art which uses inlet nipples in an open pressurized lower chamber, is virtually eliminated.

An air pressure diverter valve 180 is coupled to the manifold to relieve possible surges of air from the air inlet which might otherwise harm the air slide fabric. The valve is set to relieve air pressure from the manifold when the air pressure in the manifold exceeds the air pressure in the upper compartment of the tank by a predetermined amount, preferably on the order of three PSI.

Further, the lower compartment 150 is filled with a pressure resistant filling material 300, preferrably polyurethane foam. The polyurethane foam can be rigid or semi-flexible, expanded plastic, or elastomeric polymer that adds support and acts as a filler component to eliminate the unwanted loss of powdered material from the upper compartment into the lower compartment. The foam should be pressure resistant also. The lower compartment is filled with foam by using a pouring method, in which foam in the liquid form is poured into the lower compartment after the slope sheets have been positioned at the proper inclination in the bottom of the tank, and allowed to harden to the appropriate rigidity.

The filling material provides support for the slope sheets 120 and the air slides 130, and surrounds and supports the conduit system 220. In addition, the filling material protects the slope sheets from damage caused by pressures created in the upper chamber of the tank. Furthermore, the filling material prevents any powdered material stored in the storage compartment of the tank from entering the lower compartment. Thus any possible obstructing or congesting the flow of the aeration system is further prevented, and unwanted loss of material in the lower compartment is minimized.

In operation, the pulverulent or powdered material to be stored and/or transferred is introduced into the storage compartment 140 via the fill line 160. To unload the pulverulent material, compressed air is introduced into the air inlet 200 and is directly piped via manifold 220 to the air slides 130 thereby aerating and fluidizing the pulverulent material in the tank. The aerated material then flows by gravity like a fluid along the inclined slope sheets and air slides toward the lower central portion 166 of the tank. The air pressure in the tank causes the pulverulent material to be discharged from the tank via the discharge line 164, thereby permitting unloading of the material.

The improved conduit structure thus permits efficient delivery of the air to the air slides for aerating the material. Futhermore, the filling material 300 provides support for the slope sheets and air slides, and prevents damage to the slope sheets. In addition, loss of the powdered material from the storage chamber into the lower chamber and any obstruction of the aerating system is effectively prevented.

Although the present invention has been shown and described in terms of specific preferred embodiments, it will be appreciated by those skilled in the art that changes or modifications are possible which do not depart from the inventive concepts described and taught herein. Such changes and modifications are deemed to fall within the purview of these inventive concepts. Thus, it should be noted that the accompanying description and drawings are meant to describe the preferred embodiments of the invention, but are not intended to limit the spirit and scope thereof.

What is claimed is:

1. A pneumatic storage tank for storing pulverulent material or the like comprising,
   - a tank having a cylindrical side wall and upper and lower dished heads enclosing and sealing opposite ends of the side wall, said tank adapted to be supported in a vertical position;
   - a plurality of slope sheets within said tank, said slope sheets sealed to said cylindrical side wall, about the entire circumference of the side wall, and inclined downwardly from the side wall to the central region of the tank adjacent the lower dished head of the tank;
   - a plurality of air slides within said tank, said air slides disposed along said slope sheets and extending from the cylindrical side wall of the tank and inclinded radially downwardly from the side wall to the central region of the tank adjacent the lower dished head of the tank, wherein said slope sheets and said air slides separate said tank into an upper compartment and a lower compartment;
   - input means for providing pulverulent material or the like into the upper compartment of the tank;
   - discharge means for removing pulverulent material or the like from the upper compartment of the tank;
   - an air manifold positioned in the lower compartment of the tank, said air manifold including means for receiving air from an air source, said air manifold further including air conduit means for providing air directly to said air slides wherein said air conduit means comprises a plurality of air conduits, each air conduit extending from the air manifold to a separate air slide in a closed system such that air does not escape from the air manifold into the lower compartment of the tank external of said air manifold;
   - a filling material disposed in and completely filling the lower compartment of said tank, said filling material surrounding said air manifold, said filling material supporting the slope sheets against pressure build-up in the upper compartment of the tank; and
   - air pressure adjusting means for adjusting air pressure between the air manifold and the upper compartment of the tank, said air pressure adjusting means consisting solely of at least one air pressure diverter valve within the upper compartment of the tank and means for connecting said diverter valve to said air manifold for relieving air pressure in the air manifold when the air manifold air pressure exceeds the air pressure in the upper compartment by a predetermined amount.

2. A pneumatic storage tank as claimed in claim 1, wherein said filling material comprises a polyurethane foam.

* * * * *